United States Patent [19]

Crites

[11] Patent Number: 4,539,548
[45] Date of Patent: Sep. 3, 1985

[54] VEHICLE ALARM APPARATUS
[75] Inventor: Allan B. Crites, Elk Grove Village, Ill.
[73] Assignee: David F. Arlasky, Northbrook, Ill.
[21] Appl. No.: 399,727
[22] Filed: Jul. 19, 1982
[51] Int. Cl.³ .............................................. B60R 25/10
[52] U.S. Cl. ................................. 340/63; 307/10 AT
[58] Field of Search ............... 340/63, 65; 307/10 AT
[56] References Cited
U.S. PATENT DOCUMENTS
3,930,226 12/1976 Plumberg .................. 307/10 AT X
FOREIGN PATENT DOCUMENTS
3002257 7/1981 Fed. Rep. of Germany ........ 340/63

Primary Examiner—John W. Caldwell, Sr.
Assistant Examiner—Ellwood G. Harding
Attorney, Agent, or Firm—Marshall, O'Toole, Gerstein, Murray & Bicknell

[57] ABSTRACT

A vehicle alarm system sensing unauthorized use of the vehicle and providing a warning signal for a predetermined warning time interval which may be extended as desired. A latching circuit includes a bistable flip-flop with a capacitor discharging through a voltage divider circuit to define an extended warning time interval. Logic gates are switched to change the voltage divider circuit voltage reference levels to charge the capacitor during a predetermined exit time interval to inhibit warning signal actuation when exiting the vehicle. A re-entry timer is included to inhibit warning signal actuation when re-entering the vehicle.

10 Claims, 2 Drawing Figures

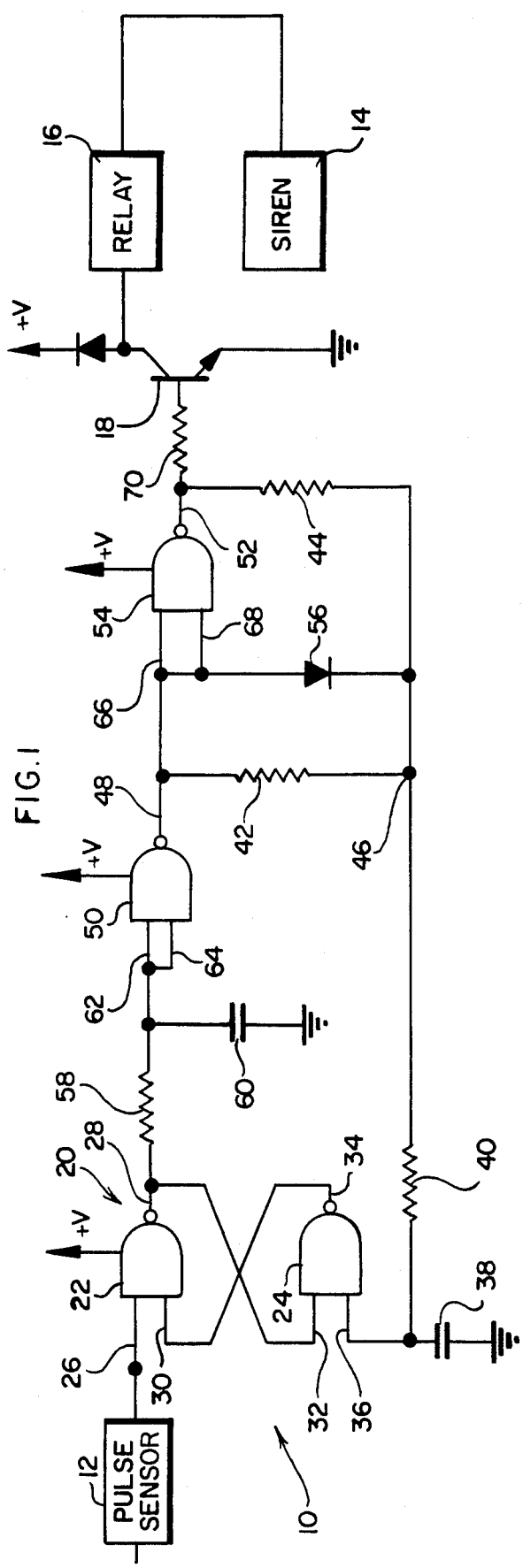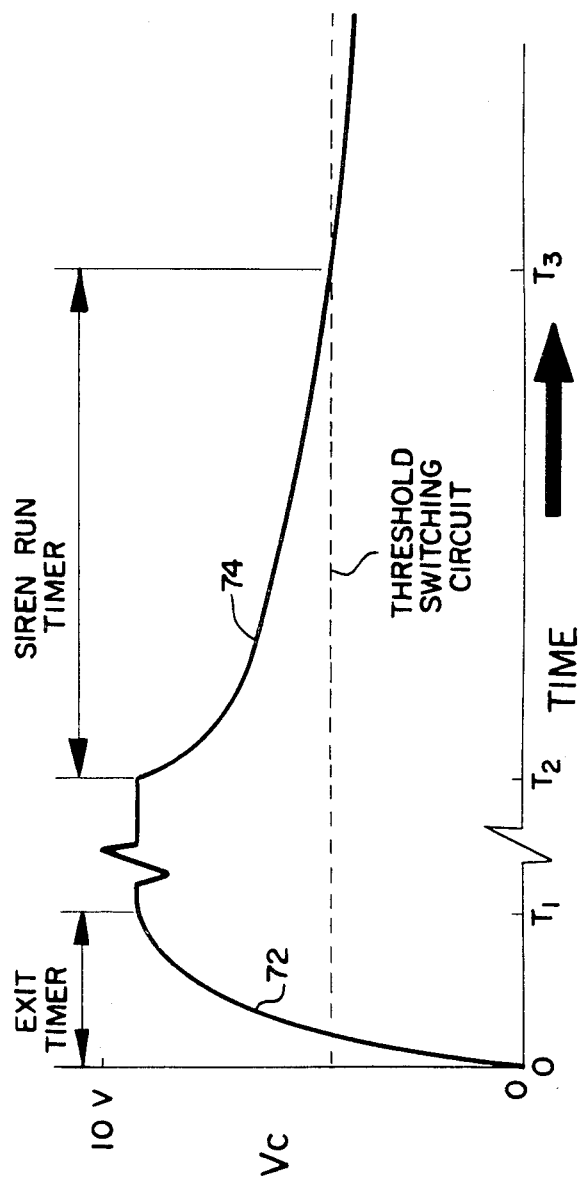

4,539,548

VEHICLE ALARM APPARATUS

This invention relates to vehicle alarm apparatus, and more particularly to such systems as used in automobiles for detecting unauthorized use and providing a warning signal for a predetermined time period.

BACKGROUND OF THE INVENTION

Reference may be made to the following U.S. Pat. Nos. of interest: 3,671,934; 3,740,713; 3,868,518.

In presently available vehicle alarm systems, unauthorized use of the vehicle is sensed and a siren or other warning device is actuated to provide an audible or visual signal for a predetermined time interval. Typically, in automobile alarm systems, after activating the alarm system to a ready condition, the siren is inhibited by an exit timer for a predetermined time interval, usually about 45 seconds, to allow the user to exit from the vehicle without actuating the siren. In addition, a re-entry timer is provided to enable an authorized user a certain time interval usually about 10-18 seconds, in order to open the car door, enter the vehicle and deactivate the alarm system. Other delay timers may be provided as well.

The requirement for providing various timing intervals in such systems has led to the desire to utilize components of one timing circuit to accomplish more than one timing function. Accordingly, a resistor/capacitor circuit may be used during capacitor charging to inhibit actuation of the siren and thereby provide an exit timing interval, and discharging of the resistor/capacitor circuit may be utilized to provide a predetermined siren actuation or "on" time. Thus, the exit timer interval will be substantially the same as the siren on time, generally about 45 seconds. It is now desired to extend the siren on time for a substantially longer time interval, approaching 3-4 minutes. While the component values of the capacitor and resistor combination could be varied to obtain the desired siren on time, this would undesirably extend the exit time interval to about the same 3-4 minutes. Since an unauthorized user can enter a vehicle very quickly and certainly in less than 2 minutes, it is undesired to inhibit siren actuation for any time period substantially more than the presently desired about 45 seconds.

Accordingly, it is desired to provide a vehicle alarm system in which the siren on time need not correspond to the exit time, and wherein the siren on time can be extended as desired to about 3-4 minutes. Secondly, it is also desired to provide a vehicle alarm system in which such an extended siren on time can be accomplished with a minimum of additional components, if any.

SUMMARY OF THE INVENTION

In accordance with the principles of the present invention, there is provided a vehicle alarm system sensing unauthorized use of the vehicle and providing a warning signal for a predetermined warning time interval, and wherein the warning time interval may be extended as desired. A latching circuit including a bistable flip-flop is responsive to unauthorized vehicle use upon such indication from a sensing device so as to actuate a siren or other warning device. The bistable flip-flop is responsive to the voltage level on a capacitor as supplied through a voltage divider circuit.

The warning time interval is determined by the time it takes the capacitor to discharge through the voltage divider circuit to a voltage threshold switching level to trigger the flip-flop circuit. The voltage divider circuit includes a first resistor connected to the capacitor at one end and at the other end to parallel connected resistors forming respective legs of the voltage divider circuit. Switching means such as logic gates are coupled to the respective resistor legs of the voltage divider circuit to provide a reference low voltage level on one leg and a reference high voltage level on the other leg to enable the capacitor to gradually discharge until reaching the predetermined voltage threshold flip-flop switching level, thus defining the predetermined time during which the siren or other warning device is actuated.

Charging of the capacitor is also accomplished through the voltage divider circuit to inhibit the bistable flip-flop circuit during an exit time interval allowing an authorized user to depart the vehicle without actuating the alarm. During this interval, the switching logic circuit is set such that the respective legs of the voltage divider circuit are provided with reference low and high voltage levels which are reversed from that supplied during the discharge interval. In addition, a diode is connected in one of the divider legs so as to be forward biased in a conductive mode during charging of the capacitor.

Thus, the warning time interval or siren on time as well as the exit time interval are provided by substantially the same components, and yet the warning time interval can be set for approximately 3-4 minutes or extended as desired, while the exit time interval can be maintained at about 45 seconds.

BRIEF DESCRIPTION OF THE DRAWINGS

The features of this invention which are believed to be novel are set forth with particularity in the appended claims. The invention may be best understood by reference to the following description taken in conjunction with the accompanying drawings, wherein like reference numerals identify like elements in the several figures and in which:

FIG. 1 is a schematic circuit diagram of a vehicle alarm system in accordance with the principles of the present invention; and FIG. 2 is an illustration of voltage waveforms useful in understanding this invention.

DETAILED DESCRIPTION

A novel vehicle alarm system 10 includes a current pulse sensor 12 for sensing unauthorized use of the vehicle to actuate a siren 14 or other warning device through a relay 16 and a relay driver 18. Alarm unit 10 also includes a bistable timing latching circuit and three delay timers as will be more particularly described hereinafter.

In the following description, the three timing intervals and associated component functions may be referred to with the following meanings: "exit timer"—inhibits siren turn on for a predetermined time interval (about 45 seconds) to permit an authorized user to activate the alarm system and leave the vehicle without premature actuation of the siren; "re-entry timer"—inhibits siren turn on for a predetermined time interval (about 10-18 seconds) to enable an authorized user to re-enter the vehicle and deactivate the alarm system without actuating the siren; and "siren run timer"—enables siren turn on for a predetermined time interval (about 3-4 minutes) following sensing of an unauthorized use of the vehicle.

Sensor 12 includes a coil placed in close proximity to the battery cable. Upon closure of a switch in series with a load such as a dome lamp, a current pulse developed in the battery cable is magnetically coupled by sensor 12 to trigger a latching circuit including a bistable flip-flop 20, comprising dual input NAND gates 22, 24. In accordance with well-known techniques, the sensed pulse exceeds the gate threshold switching voltage level to trigger gate 22 through input line 26. Gate 22 includes an output line 28 and a second input line 30 each of which is respectively connected to input line 32 and output line 34 of gate 24. Gate 24 further includes a second input line 36 connected to capacitor 38 and resistor 40. The voltage bias level at gate input line 36 is set so that gate 24 can be triggered by a threshold switching voltage level of about +3.5 volts.

Resistor 40 forms a portion of a voltage divider circuit connected to capacitor 38, the voltage divider circuit also including a first circuit leg including resistor 42 and a second circuit leg with resistor 44 branching from common terminal 46. Resistor 42 is connected to output line 48 of a logic gate 50, and resistor 44 is connected to an output line 52 of a logic gate 54. As illustrated in FIG. 1, logic gates 50 and 54 are indicated as dual input NAND gates similar to gates 22 and 24, but with their dual input lines connected together. It is to be understood that this illustration is merely for purposes of showing a preferred embodiment, since the illustrated gates may be provided by two input NAND gates in a commercially available quad NAND gate package. Other configurations of logic gates or well-known switching elements may be provided as an alternative. Diode 56 is connected with its anode connected to line 48 and its cathode connected to terminal point 46 so as to be forward biased with positive current flow from line 48 to terminal 46. Resistor 58 and capacitor 60 are interconnected between output line 28 of gate 22 and the input to gate 50 to function as a re-entry timer as will be described in more detail hereinafter.

In a constructed embodiment of the invention, the operating power is supplied from the positive 12 volt DC automobile battery, and a Zener diode shunt regulator maintains a voltage level applied to the alarm circuit at 9.4 volts. The voltage bias level at input line 26 of gate 22 is set at approximately +7 volts. It is understood, of course, that the user may connect power to the alarm circuit 10 through a standard switch in order to activate the alarm system, immediately prior to leaving the vehicle.

The operation of alarm circuit 10 will now be described, commencing with the user operating a suitable switch to apply power to the unit. When power is applied, utilizing common terminology in logic gate operations, line 26 is high, line 36 is low, line 28 is low and line 34 is high, lines 62 and 64 of gate 50 are low, line 48 is high, lines 66 and 68 of gate 54 are high and line 52 is low. Current is supplied from line 48 through diode 56 to terminal 46 at the junction of resistors 40, 42, 44 and diode 56. Current flows through resistor 44 into line 52 which is low, and through resistor 40 into capacitor 38, charging capacitor 38 and increasing the voltage level on line 36 past the threshold level and towards the +9.4 volt "high" level. When a high level appears on line 36, no change in the state of the bistable flip-flop 20 occurs. However, the flip-flop is now enabled and ready for triggering through sensor 12. During the charging time of capacitor 38, occurring in about 45 seconds, activation of siren 14 has been inhibited, to enable the authorized user to open the door and exit the vehicle without setting off the siren. Thus, an exit timer is provided and during this exit time interval, a high voltage level on line 48 and a low voltage level on line 52 control the charging of capacitor 38 through resistor 40. The alarm circuit is now activated.

Next, assuming that an authorized user enters the vehicle, thereby creating a pulse detected by sensor 12, gate 22 is triggered to change state so that line 28 goes high, and capacitor 60 now begins to charge from current flow through resistor 58. Approximately 10-18 seconds later, depending upon the desired predetermined re-entry time interval as set by the component values, the voltage level on input lines 62 and 64 reaches the threshold switching level and line 48 goes low along with lines 66 and 68 to enable line 52 to go high, thereby turning on driver 18, operating relay 16 and actuating the siren or other warning device. If an authorized user had entered the vehicle, the re-entry timer enables the user to operate the power switch in the power supply line to deactivate the unit.

When a pulse is detected and gate 22 has been triggered, thus enabling operation of siren 14 (after the re-entry time interval) continued operation of the siren is controlled by the siren run timer. Upon operation of gate 22, capacitor 38 begins from its high voltage level to discharge in the opposite direction through resistor 40 and the voltage divider circuit until the threshold switching level of about +3.5 volts is reached at line 36 to change the state of gate 24 and shut off the siren.

The siren run timer operation is accomplished as follows. Line 26 went low momentarily and returned high, line 36 is high but gradually decreasing in amplitude past the threshold level to a low voltage level, lines 62 and 64 are high, line 48 as well as lines 66 and 68 are low, and line 52 is high. As indicated previously, the discharge current flow is now out of capacitor 38, through resistor 40 into terminal 46, and the voltage divider is now formed with resistor 42 connected to a low at line 48, resistor 44 connected to a high at line 52, and diode 56 being reverse biased and therefore effectively an open circuit. While the charge and discharge current in this resistor/capacitor circuit is identical and exponential and thus determines the time during which the exit timer and the siren run timer will be effective, the voltage divider circuit with a low on resistor 42 leg and a high on resistor 44 leg raises the voltage level into which the charge from capacitor 38 can flow during discharge. Thus, the resistor/capacitor time constant has effectively been modified and the circuit is now operating on an extended segment of the exponential discharge curve as shown in FIG. 2, thus extending the siren run time.

FIG. 2 illustrates Vc, the voltage across capacitor 38, which is also the voltage level at line 36 of gate 24, as a function of time. The first segment of the curve labeled 72 illustrates the exit time of approximately 45 seconds during which capacitor 38 is charged starting from a low voltage level or zero volts to a high voltage level of about +9.4 volts at time $T_1$. Starting at time $T_2$, at the beginning of the siren on or siren run time, capacitor 38 begins to discharge into the voltage divider circuit with the voltage decreasing as illustrated in curve segment 74 of FIG. 2 until reaching the threshold switching level at line 36 of gate 24 at time $T_3$. It is to be understood of course, that the voltage divider circuit components may be adjusted such that capacitor 38 discharges towards a voltage level slightly lower than the threshold switching level at line 36. In particular, depending upon individual circuit component values, the component value of resistor 42 may be adjusted so that if capacitor 38 were allowed to discharge indefinitely, it would discharge to a voltage level effectively determined by the voltage drop across resistor 42 from terminal 46 to the low on line 48.

It is understood that whereas the present alarm circuit has been illustrated with a pulse sensor, other types of sensing devices such as instant sensors for sensing glass breakage, or motion detectors, or added hard wired switches (in the event dome lights are not available on the vehicle) may be utilized as well. Also, rather than the illustrated NAND gates, the alarm circuit may be constructed using NOR gates with appropriate reversing of the supply voltage polarity.

The foregoing detailed description has been given for clearness of understanding only, and no unnecessary limitations should be understood therefrom, as modifications will be obvious to those skilled in the art.

What is claimed is:

1. In a vehicle alarm system sensing unauthorized use and providing a warning thereof, including a warning device, means for actuating said warning device, and timing means including a resistor/capacitor charge-discharge circuit providing a first predetermined time interval during which actuation of said warning device is inhibited to permit an authorized user to exit said vehicle without actuating said warning device and a second predetermined time interval during which actuation of said warning device is enabled in response to sensing of unauthorized use of said vehicle, wherein the improvement comprises:

voltage divider means including a pair of resistors connected at one terminal end to said resistor/capacitor charge-discharge circuit and defining respective legs of said voltage divider means at the respective other terminal ends of said resistors; and switching means coupled to said respective other terminal ends of said resistors, including means for selectively providing a reference high voltage level to one resistor and a reference low voltage level to the other resistor during a charging time of said resistor/capacitor charge-discharge circuit corresponding to said first predetermined time interval, and means responsive to sensing of unauthorized use of said vehicle to thereafter provide said reference high voltage level to said other resistor and said reference low voltage level to said one resistor during a discharge time of said resistor/capacitor charge-discharge circuit corresponding to said second predetermined time interval;

whereby said second predetermined time interval is substantially increased with respect to said first predetermined time interval.

2. A vehicle alarm system according to claim 1, including a diode connected in parallel with said one resistor so as to be forward biased during said first predetermined time interval and reverse biased during said second predetermined time interval.

3. A vehicle alarm system according to claim 2, wherein said switching means comprises a semiconductor device.

4. A vehicle alarm system according to claim 2, wherein said switching means comprises semiconductor logic gates.

5. A vehicle alarm system according to claim 4, wherein said semiconductor logic gates includes a pair of series connected NAND gates.

6. A vehicle alarm system according to claim 5, including a second resistor/capacitor circuit connected at the input to the first of said pair of series connected NAND gates to inhibit actuation of said warning device to define a predetermined re-entry timing interval.

7. A vehicle alarm system sensing unauthorized use and providing a warning thereof for a predetermined warning time interval, said system comprising:

a warning device;

actuating means for actuating said warning device;

a sensing device detecting unauthorized use of said vehicle and providing an indication thereof;

latching means including a bistable flip-flop circuit responsive to said unauthorized vehicle use indication from said sensing device and coupled to said actuating means for actuating said warning device;

said latching means including a capacitor in said bistable flip-flop circuit and means responsive to the voltage level on said capacitor to trigger said flip-flop at a predetermined voltage threshold switching level; and warning timing means connected intermediate said latching means and said actuating means for actuating said warning device and thereafter triggering said bistable flip-flop at the end of said predetermined warning time interval, including;

a voltage divider circuit having a first resistor connected at one end to said capacitor and at the other end to a second and third resistor at a common terminal and forming respective legs of said voltage divider circuit at the respective other terminal ends of said second and third resistors; and gate means coupled to said respective other terminal ends of said resistors, including means responsive to said bistable flip-flop for providing a reference low voltage level on said second resistor other terminal end and a reference high voltage level on said third resistor other terminal end;

whereby said capacitor is enabled at the beginning of said predetermined warning time interval to gradually discharge through said voltage divider circuit until reaching said predetermined voltage threshold switching level to trigger said flip-flop and thereby deactivate said warning device.

8. A vehicle alarm system according to claim 7, wherein said gate means includes means responsive to said bistable flip-flop for providing a reference high voltage level on said second resistor other terminal end and a reference low voltage level on said third resistor other terminal end to charge said capacitor and inhibit operation of said warning device during a defined predetermined exit time interval, enabling an authorized user to exit the vehicle without premature operation of said warning device.

9. A vehicle alarm system according to claim 8, including a diode connected in parallel with said second resistor so as to be forward biased during said predetermined exit time interval and reverse biased during said predetermined warning time interval.

10. A vehicle alarm system according to claim 9, wherein said gate means includes a resistor/capacitor charging circuit at the input thereof, responsive to said bistable flip-flop to inhibit operation of said gate means to define a predetermined re-entry timing interval.

* * * * *